(12) United States Patent
Shim et al.

(10) Patent No.: US 12,303,999 B2
(45) Date of Patent: May 20, 2025

(54) LASER PROCESSING SYSTEM USING BESSEL BEAM AND METHOD FOR PROCESSING WORKPIECE USING BESSEL BEAM

(71) Applicant: PHILOPTICS CO., LTD., Osan-si (KR)

(72) Inventors: Sangwon Shim, Anyang-si (KR); Doyeoun Hwang, Suwon-si (KR); Yu Jin Nam, Anyang-si (KR); Sang-Gil Ryu, Seongnam-si (KR); Sungju Yu, Seoul (KR); Min Hwan Choi, Suwon-si (KR)

(73) Assignee: PHILOPTICS CO., LTD., Osan-si (KR)

( * ) Notice: Subject to any disclaimer, the term of this patent is extended or adjusted under 35 U.S.C. 154(b) by 849 days.

(21) Appl. No.: 17/595,764

(22) PCT Filed: Apr. 6, 2021

(86) PCT No.: PCT/KR2021/004300
§ 371 (c)(1),
(2) Date: Nov. 23, 2021

(87) PCT Pub. No.: WO2022/055062
PCT Pub. Date: Mar. 17, 2022

(65) Prior Publication Data
US 2022/0314364 A1    Oct. 6, 2022

(30) Foreign Application Priority Data
Sep. 8, 2020  (KR) .................. 10-2020-0114708

(51) Int. Cl.
*B23K 26/082*   (2014.01)
*B23K 26/046*   (2014.01)
(Continued)

(52) U.S. Cl.
CPC .......... *B23K 26/082* (2015.10); *B23K 26/046* (2013.01); *B23K 26/0643* (2013.01);
(Continued)

(58) Field of Classification Search
CPC ............... B23K 26/082; B23K 26/046; B23K 26/0643; B23K 26/0648; B23K 26/067;
(Continued)

(56) References Cited

U.S. PATENT DOCUMENTS

| 5,583,342 A | 12/1996 | Ichie et al. |
| 10,707,130 B2 | 7/2020 | Chen et al. |

(Continued)

FOREIGN PATENT DOCUMENTS

| CN | 105081586 A | 11/2015 |
| CN | 106994564 A | 8/2017 |

(Continued)

OTHER PUBLICATIONS

Extended European Search Report for EP21783385.4 by European Patent Office dated Jul. 12, 2022.

*Primary Examiner* — John P. Dulka
(74) *Attorney, Agent, or Firm* — BROADVIEW IP LAW, PC

(57) ABSTRACT

A laser processing system according to an embodiment of the present invention includes: a laser unit emitting a laser beam; an optical unit disposed on a propagation path of the laser beam and modulating the incident laser beam into a Bessel beam; a stage on which a workpiece to be processed with the Bessel beam emitted from the optical unit is mounted; and a control unit for controlling the operations of the laser unit, the optical unit, and the stage, wherein the optical unit is configured to position the focus line of the
(Continued)

emitted Bessel beam on the workpiece and to move the focus line positioned on the workpiece with a predetermined range.

15 Claims, 5 Drawing Sheets

(51) Int. Cl.
  *B23K 26/06* (2014.01)
  *B23K 26/067* (2006.01)
  *B23K 26/073* (2006.01)
  *B23K 26/38* (2014.01)

(52) U.S. Cl.
  CPC ........ *B23K 26/0648* (2013.01); *B23K 26/067* (2013.01); *B23K 26/0734* (2013.01); *B23K 26/38* (2013.01)

(58) Field of Classification Search
  CPC ................ B23K 26/0734; B23K 26/38; B23K 2101/40; B23K 2103/54; B23K 2103/56; B23K 26/0624; B23K 26/0652; B23K 26/0665; B23K 26/0853; B23K 26/382; B23K 26/40; B23K 26/402; B23K 26/064; B23K 26/0821; B23K 26/04; B23K 26/08; C03B 33/023
  See application file for complete search history.

(56) References Cited

U.S. PATENT DOCUMENTS

| | | |
|---|---|---|
| 2017/0252859 A1* | 9/2017 | Kumkar ................. B23K 26/06 |
| 2017/0259375 A1 | 9/2017 | Kumkar et al. |
| 2018/0056443 A1 | 3/2018 | Kramer et al. |
| 2018/0157006 A1 | 6/2018 | Aslanov et al. |
| 2018/0345419 A1 | 12/2018 | Mikutis et al. |
| 2020/0101562 A1 | 4/2020 | Kiessling et al. |

FOREIGN PATENT DOCUMENTS

| | | |
|---|---|---|
| CN | 109890553 A | 6/2019 |
| CN | 111151873 A | 5/2020 |
| CN | 111505831 A | 8/2020 |
| JP | 2005-288503 A | 10/2005 |
| JP | 2010-075996 | 4/2010 |
| JP | 2015-520938 A | 7/2015 |
| JP | 2016-509540 A | 3/2016 |
| KR | 10-2015-0118312 A | 10/2015 |
| KR | 10-2017-0086594 A | 7/2017 |
| KR | 10-2018-0065058 A | 6/2018 |
| TW | 201626050 A | 7/2016 |

* cited by examiner

LASER PROCESSING SYSTEM USING BESSEL BEAM AND METHOD FOR PROCESSING WORKPIECE USING BESSEL BEAM

TECHNICAL FIELD

The present invention relates to a processing system and a processing method for processing a workpiece using a laser.

BACKGROUND ART

A laser is widely used for processing such as for cutting a processing object or forming a hole.

In general, in the processing using a laser, an optical element such as a lens is used to form a laser beam of a desired shape suitable for processing work, and the formed laser beam is irradiated to a workpiece.

In particular, the laser beam may be efficiently used for the processing such as cutting of brittle materials that are difficult to process such as transparent glass substrates, or drilling of holes. However, during the cutting operation of the glass substrate, cracks are generated in the workpiece by the laser and the cracks propagate, thereby cutting the workpiece. Accordingly, there is a problem that the cracks can be generated non-uniformly and the incision surface is uneven.

In addition, since an accurate process is difficult in the cutting of the glass substrate of a large area using the laser and a lot of work time is taken, there is a difficulty in free shape processing.

DISCLOSURE

Technical Problem

One aspect of the present invention is to provide a system and a method capable of processing a workpiece (an object to be processed) at high speed by using a laser beam.

Technical Solution

A laser processing system according to an embodiment of the present invention includes: a laser unit emitting a laser beam; an optical unit disposed on a propagation path of the laser beam and modulating the incident laser beam into a Bessel beam; a stage on which a workpiece to be processed with the Bessel beam emitted from the optical unit is mounted; and a control unit for controlling the operations of the laser unit, the optical unit, and the stage, wherein the optical unit is configured to position the focus line of the emitted Bessel beam on the workpiece and to move the focus line positioned on the workpiece within a predetermined range.

The optical unit may maintain the angle between the focus line of the emitted Bessel beam and the processed surface of the workpiece in the range of 80-100 degrees.

The optical unit may include a first optical unit that modulates the incident laser beam into the Bessel beam, and a second optical unit that moves the focus line of the emitted Bessel beam in a direction intersecting the focus line on the workpiece.

The first optical unit may include a first optical element that modulates the incident laser beam into a Bessel beam, and a second optical element that advances the optical axis of the Bessel beam passing through the first optical element in parallel.

The second optical unit may include a scanner moving the path of the Bessel beam that has passed through the first optical unit, and a focusing lens positioning the focus line of the Bessel beam emitted from the scanner on the workpiece.

The control unit may drive the scanner so that the focus line of the emitted Bessel beam moves in at least two axis directions and simultaneously drives the stage in the at least two axis directions.

The diameter of the Bessel beam entering the scanner may be 3-30 mm.

The focal length of the focusing lens may be 10-300 mm.

The distance that the focus line of the Bessel beam emitted from the scanner moves on the workpiece may be 1 μm-30 mm.

The scanner may include a plurality of mirrors whose angle is adjusted by the control unit.

The workpiece may be in a form of a flat plate.

On the other hand, a laser processing method as a method of processing a workpiece by irradiating a laser beam according to an embodiment of the present invention includes: modulating the laser beam having a circular cross-section perpendicular to a direction of the laser beam into a Bessel beam having an annular cross-section; and irradiating the Bessel beam to the workpiece and processing the workpiece while the focus line of the Bessel beam is positioned on the workpiece to be processed, and in the processing, the focus line of the Bessel beam positioned on the workpiece moves.

In the processing, the workpiece may move and the focus line of the Bessel beam may simultaneously move.

The processing may include setting a processing path corresponding to the shape to process the workpiece, separating the predetermined processing path into a first path through which the focus line of the Bessel beam moves and a second path through which the workpiece moves, and moving the focus line of the Bessel beam to the first path and simultaneously moving the workpiece to the second path, thereby processing the workpiece along the processing path.

In the processing, the angle between the focus line of the Bessel beam and the processed surface of the workpiece may be maintained in the range of 80-100 degrees.

In the processing, the distance that the focus line of the Bessel beam positioned on the workpiece moves on the workpiece may be 1 μm-30 mm.

The processing may include moving a path of the Bessel beam that is reflected by adjusting an angle of a mirror positioned on the path of the Bessel beam for scanning, and focusing the reflected Bessel beam onto the workpiece.

In the scanning, the diameter of the Bessel beam incident to the mirror may be 3-30 mm.

In the focusing, a focal length may be 10-300 mm.

Advantageous Effects

According to an embodiment of the present invention, by modulating the laser beam into the Bessel beam, it is possible to precisely process the workpiece.

In addition, the workpiece may be processed at a high speed by scanning the Bessel beam to expand the irradiation area.

In addition, by maintaining the angle at which the scanned Bessel beam is incident on the processed surface close to vertical, the processing quality may be improved.

Further, by simultaneously controlling the movement of the Bessel beam and the workpiece, precise shapes may be processed and processing time may be saved.

In addition, through the synchronization technology between the scanner and the stage, it is possible to process regardless of the size of the workpiece.

MODE FOR INVENTION

Figure 1:
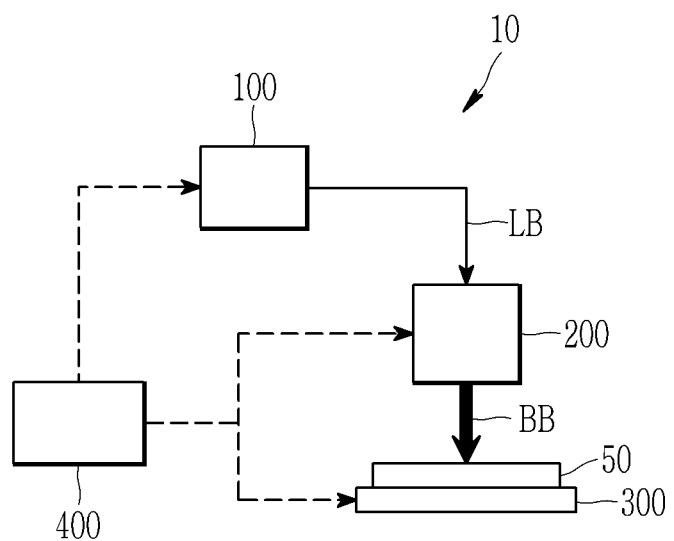
FIG. 1 is a schematic diagram of a laser processing system according to an embodiment of the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise", and variations such as "comprises" or "comprising", will be understood to imply the inclusion of stated elements but not the exclusion of any other elements.

In the present specification, "front" and "rear" are named based on a beam propagation direction, and the direction accessing the workpiece is defined as "the rear".

FIG. 1 is a schematic diagram of a laser processing system according to an embodiment of the present invention.

Referring to FIG. 1, the laser processing system 10 according to an embodiment of the present invention includes a laser unit 100, an optical unit 200, a stage 300, and a control unit 400.

In the laser processing system 10, a laser beam LB emitted from the laser unit 100 is modulated into a Bessel beam BB shape through the optical unit 200, and the Bessel beam BB is irradiated to the workpiece 50 fixed to the stage 300 to process the workpiece 50. At this time, according to an embodiment of the present invention, the Bessel beam BB irradiated to the workpiece 50 may process the workpiece 50 at a high speed while scanning a predetermined range of the workpiece 50. In addition, by the control unit 400, the beam BB scans and the stage 300 is simultaneously driven, so that high-speed and precise processing is possible. Hereinafter, each configuration of the laser processing system 10 according to an embodiment of the present invention is described in detail.

The laser unit 100 is configured to emit the laser beam LB for processing the workpiece 50, and may generate the laser beam having a predetermined pulse to be emitted in a form of a beam. In this case, the emitted laser beam LB may have a pulse (e.g., an ultra-short pulse) or a burst pulse having a wavelength, energy, and a duration suitable for processing the workpiece 50. In addition, the laser beam LB may have a circular shape or a Gaussian beam shape when viewed in the traveling direction (a cross-section perpendicular to the traveling direction).

Here, the workpiece 50 may have a flat plate shape, for example, a transparent glass substrate. However, the workpiece 50 is not limited to the transparent glass substrate, and may include various materials such as an opaque substrate, a metal material, and a semiconductor wafer.

Figure 2:
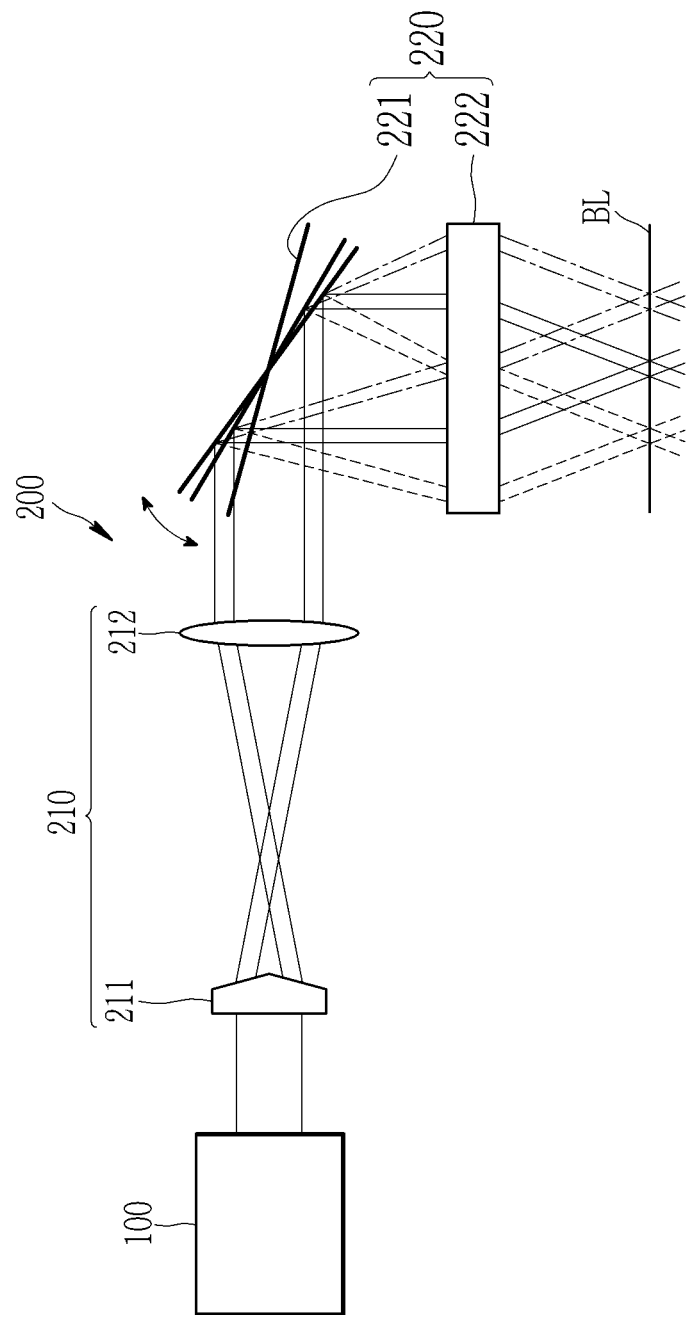
FIG. 2 is a view showing an optical unit of a laser processing system according to an embodiment of the present invention.
Figure 3:
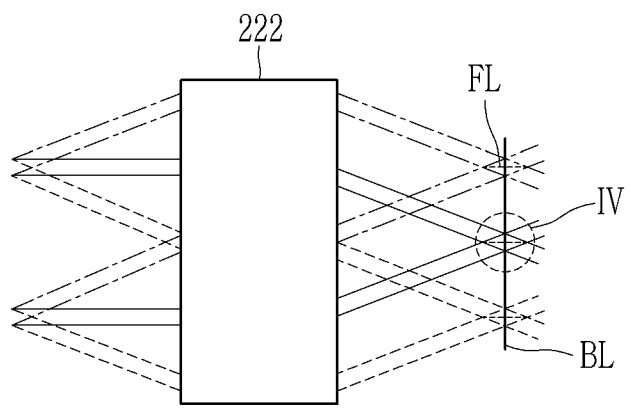
FIG. 3 is a view showing a state of being scanned through an optical unit among a laser processing system according to an embodiment of the present invention.
Figure 4:
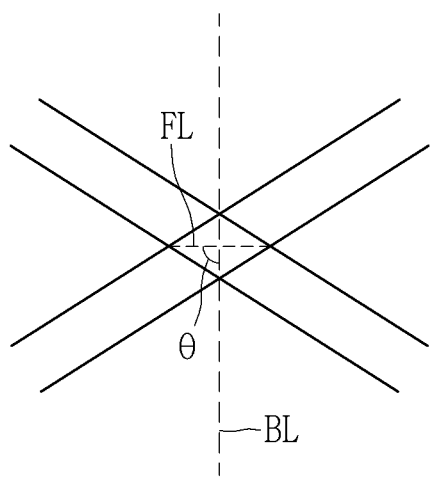
FIG. 4 is an enlarged view of a portion IV of FIG. 3.

FIG. 2 is a view showing an optical unit of a laser processing system according to an embodiment of the present invention, and FIG. 3 is a view showing a state of being scanned through an optical unit among a laser processing system according to an embodiment of the present invention. Also, FIG. 4 is an enlarged view of a portion IV of FIG. 3.

The optical unit 200 is disposed on the propagation path of the laser beam LB emitted from the laser unit 100 and is configured to modulate the incident laser beam LB to the Bessel beam BB. According to an embodiment of the present invention, the optical unit 200 may be configured to move the focus line FL positioned on the workpiece 50 by a predetermined range while positioning the focus line FL of the emitted beam BB on the workpiece 50. Referring to FIG. 3 and FIG. 4, 'the focus line FL' in this specification means a condensing length or a focus depth of the Bessel beam incident on the workpiece.

Referring to FIG. 1 and FIG. 2, the optical unit 200 may include a first optical unit 210 and a second optical unit 220.

The first optical unit 210 is an optical unit that modulates the laser beam LB into the Bessel beam BB, and may include a first optical element 211 and a second optical element 212 disposed to the rear of the first optical element 211.

The first optical element 211 may be a diffraction element for modulating the laser beam LB into the Bessel beam BB, for example a conical prism or an axicon lens. Therefore, while the laser beam LB is diffracted while passing through the first optical element 211 (when being viewed in the beam propagation direction, or the cross-section perpendicular to the beam propagation direction), it may be modulated into the annular (ring) Bessel beam BB. However, the first optical element 211 is not limited to the conical prism or the axicon lens, and various optical elements capable of modulating the laser beam LB into the Bessel beam BB may be used.

Referring to FIG. 2, after the laser beam LB passes through the first optical element 211 and is modulated into the Bessel beam BL, the second optical element 212 capable of restricting the expansion of the area of the Bessel beam BL suitable for machining the workpiece 50 may be provided behind the first optical element 211. That is, the second optical element 212 may be an optical element for parallelly advancing the optical axis of the Bessel beam BL emitted from the first optical element 211, for example, a collimating lens or a collimating lens. The optical axis of the Bessel beam BB passing through the second optical element 212 may be arranged in parallel, and then be incident to the second optical unit 220.

According to an embodiment of the present invention, the above-described first optical element 211 and second optical element 212 may be appropriately selected or adjusted in each optical property, arrangement interval, etc., thereby the diameter of the Bessel beam BB passing through the second optical element 212 to be incident to the second optical unit 220 or the scanner 221 may be in the range of 3-30 mm.

The second optical unit 220 is configured to move the focus line FL of the emitted beam BB on the workpiece 50, and may include a scanner 221 and a focusing lens 222. According to an embodiment of the present invention, the focus line FL of the Bessel beam BB emitted through the second optical unit 220 may be positioned on the workpiece 50, and the focus line FL may be moved in a direction intersecting the focus line FL while remaining positioned on the workpiece 50, and accordingly, the workpiece 50 may be machined while scanning the vessel beam BB within a predetermined range on the workpiece 50.

Referring to FIG. 2, the scanner 221 may move the path of the Bessel beam BB passing through the first optical unit 210. In more detail, the scanner 221 may continuously change the optical axis direction of the incident Bessel beam BB within a predetermined angle range, and through this, the scanner 221 may scan the emitted Bessel beam BB within a predetermined range.

According to an embodiment of the present invention, the scanner 221 may include a plurality of mirrors whose angle is adjusted. Accordingly, the Bessel beam BB incident to the scanner 221 is reflected by a plurality of mirrors, and the reflection angle of the reflected Bessel beam BB, by adjusting the angle of the mirror, may be adjusted. For example, the scanner 221 may include at least two mirrors that are respectively rotatable along the rotation axes arranged in at least two axis directions and may be configured as, for example, galvano mirrors. However, the configuration of the scanner 221 is not limited to a galvanometer, and may include various devices capable of scanning the emitted Bessel beam BB within a predetermined area range.

The Bessel beam BB whose path is changed through the scanner 221 may be focused on the workpiece 50 by the focusing lens 222. The focusing lens 222 may be disposed between the scanner 221 and the workpiece 50, and the focus line FL of the Bessel beam BB emitted from the scanner 221 may be positioned on the workpiece 50. As will be described later, the focusing lens 222 may keep the focus line FL of the Bessel beam BB as perpendicular as possible to the processed surface BL of the workpiece.

Referring to FIG. 2 to FIG. 4, the Bessel beam BB is focused by the focusing lens 222, so that the focus line FL of the Bessel beam BB may be positioned on the processed surface BL of the workpiece 50. According to an embodiment of the present invention, the focal length of the focusing lens 222 may be configured in a range of 10-300 mm. Accordingly, the workpiece 50 may be positioned and machined to be spaced apart by a distance corresponding to the focal length of the focusing lens 222.

In FIG. 2 to FIG. 4, the processed surface of the workpiece 50 is indicated by a reference numeral BL. Here, the processed surface BL does not mean an exterior side where the processing of the workpiece 50 starts, but it means a virtual surface including an arbitrary point among the parts to be processed on the workpiece 50. The workpiece 50 may have a predetermined thickness, and depending on the processing method, the focus line FL of the Bessel beam BB positioned on the workpiece 50 may be positioned over the entire thickness of the workpiece 50 or only a portion of the thickness of the workpiece 50.

According to an embodiment of the present invention, in the state that the focus line FL of the Bessel beam BB emitted from the optical unit 200 is poisoned on the workpiece 50, by moving the focus line FL of the Bessel beam BB positioned on the workpiece 50, the predetermined range of the workpiece 50 may be scanned. In this case, the state that the focus line FL of the Bessel beam BB is poisoned on the workpiece 50 may be maintained, and the distance that the focus line FL of the Bessel beam BB is moved on the workpiece 50 (or on the processed surfaced) may be the range of 1 μm-30 mm. Here, the movement distance is a movement distance in one direction (e.g., the x-axis direction or the y-axis direction in FIG. 5). For example, when the focus line FL of the Bessel beam BB moves in two axis directions (the x-axis and the y-axis directions), the Bessel beam BB may process while scanning a predetermined range on the x and y axes of the workpiece 50.

Referring to FIG. 3 and FIG. 4, the angle θ between the focus line FL of the beam BB positioned on the workpiece 50 and the processed surface BL of the workpiece may be close to 90 degrees. More specifically, according to an embodiment of the present invention, while the focus line FL of the Bessel beam BB is moved (scanning) in a predetermined range on the workpiece 50, the angle θ between the focus line FL of the beam BB and the processed surface BL of the workpiece may be maintained in the range of 80-100 degrees.

That is, although the focus line FL of the Bessel beam BB is scanned on the processed surface BL of the workpiece by the scanner 221, the angle θ between the focus line FL of the Bessel beam BB and the processed surface BL of the workpiece may be maintained in the range of 80-100 degrees. In other words, the Bessel beam BB passing through the focusing lens 222 is incident on the processed surface BL of the workpiece at the angle close to vertical, and an angle deviating from the vertical direction may be maintained within a range of 10 degrees or less. In the laser processing system 10 according to an embodiment of the present invention, the Bessel beam BB generated by the first optical element 211, which is a diffraction element, causes an interference effect in a predetermined processing position and range, and maintaining the characteristic uniformly affects the processing quality. Therefore, for excellent and uniform processing quality, it is important how the vertical degree of the interference beam incident on the processed surface of the workpiece 50 is maintained. According to an embodiment of the present invention, while the focus line FL of the Bessel beam BB positioned on the workpiece 50 scans the processed surface of the workpiece, since the angle θ formed with the processed surface BL of the workpiece is maintained in the range of 80-100 degrees, it is possible to maintain excellent and uniform processing quality while performing high-speed processing.

According to an embodiment of the present invention, the workpiece 50 may be fixed to the stage 300. That is, the stage 300 is a part on which the workpiece 50 is mounted to fix the position of the workpiece 50.

Referring to FIG. 1, the above-described laser unit 100, optical unit 200, and stage 300 may be controlled through the control unit 400.

The control unit 400 may adjust the wavelength, energy, and duration of the pulse of the laser beam LB generated by the laser unit 100 to match the characteristic of the workpiece 50.

Also, the control unit 400 may drive the scanner 221 to move the Bessel beam BB incident on the workpiece 50. According to an embodiment of the present invention, the control unit 400 may drive the scanner 221 to move the focus line FL of the Bessel beam BB in at least two axes (the x-axis and the y-axis) directions on the processed surface BL. For example, when the scanner 221 includes a plurality of mirrors pivotally rotating about the rotation axes arranged in at least two axis directions, the control unit 400 may control a driving means for rotating each of a plurality of mirrors in a predetermined angle range (e.g., a driving motor). Through this, the focus line FL of the Bessel beam BB is moved along the x-axis and the y-axis on the processed surface BL, so that a predetermined range may be scanned.

Also, the control unit 400 may move the stage 300 to which the workpiece 50 is fixed. According to an embodiment of the present invention, the control unit 400 may drive the scanner 221 and simultaneously drive the stage 300. For example, the control unit 400 may rotate the mirror at a high speed in a predetermined angle range so that the angle of the mirror of the scanner 221 is continuously adjusted, and simultaneously drive the stage 300 at a low speed in at least two axes (the x-axis and the y-axis) directions. Here, the stage 300 (compared to the scanner) has a slow response and is driven at a low speed and may have a wide processing area, whereas the scanner 221 (compared to the stage) has a fast response and is driven at a high speed and can have a narrow processing area. Accordingly, an embodiment of the present invention enables a more precise process and saves processing time by simultaneously controlling the stage 300 and the scanner 221 compared to the conventional method of processing the workpiece by moving only the stage 300. In addition, by simultaneously synchronizing and controlling the stage 300 and the scanner 221, the processing may be performed regardless of the size of the workpiece.

Next, the method of processing the workpiece by using the above-described laser processing system according to an embodiment of the present invention is described.

Figure 5:
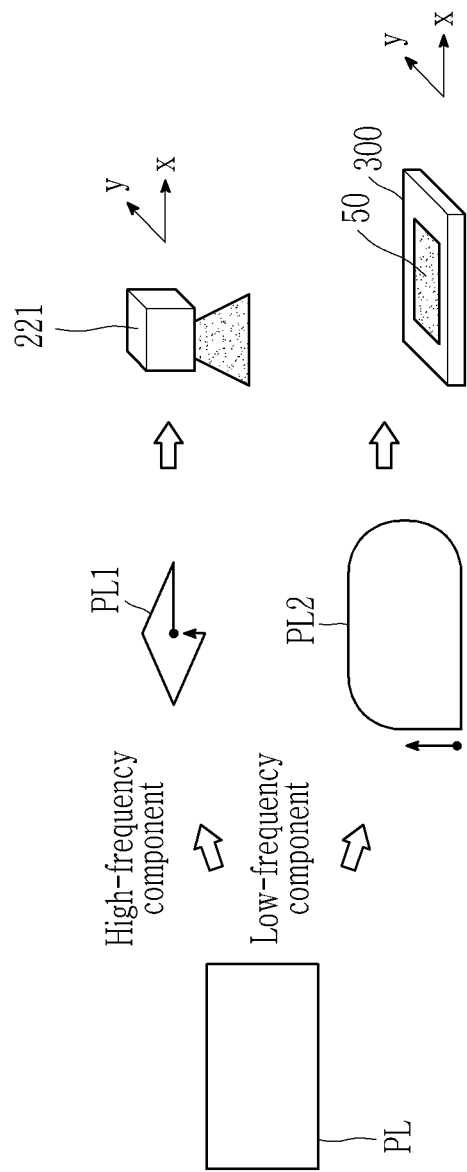
FIG. 5 is a view illustrating a process in which a workpiece (an object to be processed) is processed through a laser processing method according to an embodiment of the present invention.

FIG. 5 is a view showing a process that a workpiece is processed through a laser processing method according to an embodiment of the present invention. FIG. 5 is showing the process of processing a shape, and shows that the processing proceeds from the left to the right.

Referring to FIG. 5, In order to process a final quadrangle-shaped processing path PL in the workpiece 50, the first processing path PL1 through the driving of the scanner 221 and the second processing path PL2 through the driving of the stage 300 may be simultaneously performed. That is, when only the stage 300 is moved for the processing path PL of the final quadrangle, even if the control signal is transmitted from the control unit 400 (referring to FIG. 1) to the stage 300, due to the limitation of the response and the movement speed (acceleration), the processing quality may be deteriorated in an area such as the edge of the final quadrangle processing path PL. However, according to an embodiment of the present invention, the control unit 400 controls the stage 300 moving in the wide processing area and simultaneously controls the scanner 221 (e.g., the mirror that pivots and rotates around the rotation axis) having the responsiveness and the fast movement speed (the acceleration) while moving in the relatively narrow processing area, thereby the final processing path PL with improved quality while reducing the processing time may be processed.

For example, in order to realize the two-dimensional final processing path PL of the x-axis and y-axis, the electrical control signal transmitted from the control unit 400 to the stage 300 and the scanner 221 may be separated into a high-frequency component and a low-frequency component through a filter. Here, the high-frequency component may be a signal of the first processing path PL1, which is a high-speed movement path, and may be transmitted to the scanner 221. In addition, the low-frequency component may be a signal of the second processing path PL2, which is a low-speed movement path, and may be transmitted to the stage 300. As above-described, according to an embodiment of the present invention, as the control unit 400 simultaneously controls the scanner 221 and the stage 300, the first processing path PL1 through the scanner 221 and the second processing path PL2 through the stage 300 may be combined to process the final processing path PL.

Meanwhile, since the scanner 221 and the stage 300 are simultaneously synchronized and controlled, the processing may be performed without being limited to the field of view (FOV) of the scanner 221. Therefore, according to an embodiment of the present invention, by synchronizing and simultaneously controlling the stage 300 and the scanner 221, it is possible to precisely process the workpiece regardless of the size of the workpiece.

As described above, according to an embodiment of the present invention, by modulating the laser beam LB to the Bessel beam BB, the workpiece 50 such as a glass substrate may be precisely processed. At this time, the workpiece 50 may be processed at high speed by scanning the Bessel beam BB irradiated to the workpiece 50 and expanding the irradiation area. In addition, by simultaneously controlling the movement of the Bessel beam BB and the workpiece 50, a precise shape may be machined and the processing time may be saved.

While this invention has been described in connection with what is presently considered to be practical embodiments, it is to be understood that the invention is not limited to the disclosed embodiments. On the contrary, it is intended to cover various modifications and equivalent arrangements included within the scope of the appended claims.

| (Description of Reference Numerals) | |
| --- | --- |
| 10 laser processing system | 50 workpiece |
| 100 laser unit | 200 optical unit |
| 210 first optical unit | 211 first optical element |
| 212 second optical element | 220 second optical unit |
| 221 scanner | 222 focusing lens |
| 300 stage | 400 control unit |

The invention claimed is:

1. A laser processing system comprising:
a laser unit emitting a laser beam;
an optical unit disposed on a propagation path of the laser beam and modulating the incident laser beam into a Bessel beam;
a stage on which a workpiece to be processed with the Bessel beam emitted from the optical unit is mounted; and
a control unit for controlling the operations of the laser unit, the optical unit, and the stage,
wherein the optical unit is configured to position a focus line of the emitted Bessel beam on the workpiece and to move the focus line positioned on the workpiece within a predetermined range,
wherein
the optical unit includes
a first optical unit that modulates the incident laser beam into the Bessel beam, and
a second optical unit that moves the focus line of the emitted Bessel beam in a direction intersecting the focus line on the workpiece,
wherein
the second optical unit includes a scanner moving the path of the Bessel beam that has passed through the first optical unit, and a focusing lens positioning the focus line of the Bessel beam emitted from the scanner on the workpiece,
wherein
the control unit drives the scanner so that the focus line of the emitted Bessel beam moves in at least two axis directions and simultaneously drives the stage in the at least two axis directions.

2. The laser processing system of claim 1, wherein the optical unit maintains the angle between the focus line of the emitted Bessel beam and the processed surface of the workpiece in the range of 80-100 degrees.

3. The laser processing system of claim 1, wherein the first optical unit includes a first optical element that modulates the incident laser beam into the Bessel beam, and a second optical element that advances the optical axis of the Bessel beam passing through the first optical element in parallel.

4. The laser processing system of claim 1, wherein the diameter of the Bessel beam entering the scanner is 3-30 mm.

5. The laser processing system of claim 1, wherein the focal length of the focusing lens is 10-300 mm.

6. The laser processing system of claim 1, wherein the workpiece is a form of a flat plate.

7. A laser processing system comprising:
a laser unit emitting a laser beam;
an optical unit disposed on a propagation path of the laser beam and modulating the incident laser beam into a Bessel beam;
a stage on which a workpiece to be processed with the Bessel beam emitted from the optical unit is mounted; and
a control unit for controlling the operations of the laser unit, the optical unit, and the stage,
wherein the optical unit is configured to position a focus line of the emitted Bessel beam on the workpiece and to move the focus line positioned on the workpiece within a predetermined range,
wherein
the optical unit includes
a first optical unit that modulates the incident laser beam into the Bessel beam, and
a second optical unit that moves the focus line of the emitted Bessel beam in a direction intersecting the focus line on the workpiece,
wherein
the second optical unit includes a scanner moving the path of the Bessel beam that has passed through the first optical unit, and a focusing lens positioning the focus line of the Bessel beam emitted from the scanner on the workpiece, wherein
the distance that the focus line of the Bessel beam emitted from the scanner moves on the workpiece is 1 µm-30 mm.

8. A laser processing system comprising:
a laser unit emitting a laser beam;
an optical unit disposed on a propagation path of the laser beam and modulating the incident laser beam into a Bessel beam;
a stage on which a workpiece to be processed with the Bessel beam emitted from the optical unit is mounted; and
a control unit for controlling the operations of the laser unit, the optical unit, and the stage,
wherein the optical unit is configured to position a focus line of the emitted Bessel beam on the workpiece and to move the focus line positioned on the workpiece within a predetermined range,
wherein
the optical unit includes
a first optical unit that modulates the incident laser beam into the Bessel beam, and
a second optical unit that moves the focus line of the emitted Bessel beam in a direction intersecting the focus line on the workpiece,
wherein
the second optical unit includes a scanner moving the path of the Bessel beam that has passed through the first optical unit, and a focusing lens positioning the focus line of the Bessel beam emitted from the scanner on the workpiece, wherein
the scanner includes a plurality of mirrors whose angle is adjusted by the control unit.

9. A laser processing method as a method of processing a workpiece by irradiating a laser beam, comprising:
modulating the laser beam having a circular cross-section perpendicular to a direction of the laser beam into a Bessel beam having an annular cross-section; and
irradiating the Bessel beam to the workpiece and processing the workpiece while a focus line of the Bessel beam is positioned on the workpiece to be processed, and
in the processing, the focus line of the Bessel beam positioned on the workpiece moves,
wherein
in the processing,
the workpiece moves and simultaneously the focus line of the Bessel beam moves.

10. The laser processing method of claim 9, wherein in the processing, the angle between the focus line of the Bessel beam and the processed surface of the workpiece is maintained in the range of 80-100 degrees.

11. The laser processing method of claim 9, wherein the processing includes
moving a path of the Bessel beam that is reflected by adjusting an angle of a mirror positioned on the path of the Bessel beam for scanning, and
focusing the reflected Bessel beam onto the workpiece.

12. The laser processing method of claim 11, wherein in the scanning, the diameter of the Bessel beam incident to the mirror is 3-30 mm.

13. The laser processing method of claim 11, wherein in the focusing, a focal length is 10-300 mm.

14. A laser processing method as a method of processing a workpiece by irradiating a laser beam, comprising:
modulating the laser beam having a circular cross-section perpendicular to a direction of the laser beam into a Bessel beam having an annular cross-section; and
irradiating the Bessel beam to the workpiece and processing the workpiece while a focus line of the Bessel beam is positioned on the workpiece to be processed, and in the processing, the focus line of the Bessel beam positioned on the workpiece moves, wherein the processing includes setting a processing path corresponding to a shape to process the workpiece, separating the predetermined processing path into a first path through which the focus line of the Bessel beam moves and a second path through which the workpiece moves, and moving the focus line of the Bessel beam to the first path and simultaneously moving the workpiece to the second path, thereby processing the workpiece along the processing path.

15. A laser processing method as a method of processing a workpiece by irradiating a laser beam, comprising:

modulating the laser beam having a circular cross-section perpendicular to a direction of the laser beam into a Bessel beam having an annular cross-section; and irradiating the Bessel beam to the workpiece and processing the workpiece while a focus line of the Bessel beam is positioned on the workpiece to be processed, and in the processing, the focus line of the Bessel beam positioned on the workpiece moves, wherein in the processing, the distance that the focus line of the Bessel beam positioned on the workpiece moves on the workpiece is 1 µm-30 mm.

* * * * *